(12) United States Patent
Christiansen et al.

(10) Patent No.: US 10,378,377 B2
(45) Date of Patent: Aug. 13, 2019

(54) TEST RIG FOR A BACK-TO-BACK TEST OF A TURBINE

(71) Applicant: Siemens Gamesa Renewable Energy A/S, Brande OT (DK)

(72) Inventors: Morten Grostoel Oernhoej Christiansen, Varde (DK); Brian Gabe Jensen, Horsens (DK); Martin Bebe Malligsen, Vildbjerg (DK)

(73) Assignee: Siemens Gamesa Renewable Energy A/S (DK)

( * ) Notice: Subject to any disclaimer, the term of this patent is extended or adjusted under 35 U.S.C. 154(b) by 167 days.

(21) Appl. No.: 15/629,868

(22) Filed: Jun. 22, 2017

(65) Prior Publication Data

US 2018/0003074 A1  Jan. 4, 2018

(30) Foreign Application Priority Data

Jun. 30, 2016 (EP) .................................... 16177071

(51) Int. Cl.
*F01D 21/00* (2006.01)
*G01M 15/00* (2006.01)
(Continued)

(52) U.S. Cl.
CPC .......... *F01D 21/003* (2013.01); *F03D 13/30* (2016.05); *F03D 15/00* (2016.05); *F03D 17/00* (2016.05);
(Continued)

(58) Field of Classification Search
CPC ........ F01D 21/003; F03D 13/30; F03D 15/00; F03D 17/00; G01M 15/14; G01M 15/00; Y02E 10/72; F05D 2260/83
See application file for complete search history.

(56) References Cited

U.S. PATENT DOCUMENTS 7,178,406 B2 *  2/2007  Gonzalez ............ G01M 99/008
                                                        73/856
7,819,019 B2 * 10/2010  Bisgaard ............... G01M 5/005
                                                        73/856
(Continued)

FOREIGN PATENT DOCUMENTS

AT        605687 B1    11/2009
CN      101484697 A     7/2009
(Continued)

OTHER PUBLICATIONS

European Search Report for European Application No. EP 16177071.4, dated Jan. 25, 2017.
(Continued)

*Primary Examiner* — Freddie Kirkland, III
(74) *Attorney, Agent, or Firm* — Schmeiser, Olsen & Watts LLP

(57) ABSTRACT

Test rig for a back-to-back test of a turbine, including an axle supported in at least one bearing fixed to a carrier, a gear coupled to the axle and a motor coupled to the gear, whereby a gear bearing arrangement comprising two radially extending arms to be coupled to the gear and extending in opposite directions, which arms are pivotally connected to a pair of torque arms extending in a basically parallel direction, with the ends of the torque arms being pivotally coupled to a frame including lateral extensions extending in opposite directions with connection segments, to which segments respective second torque arms arranged in a basically vertical direction in respect to the pair of torque arms are pivotally connected, which second torque arms are pivotally connected to a respective connection element arranged at the carrier.

9 Claims, 6 Drawing Sheets

Figure 1:
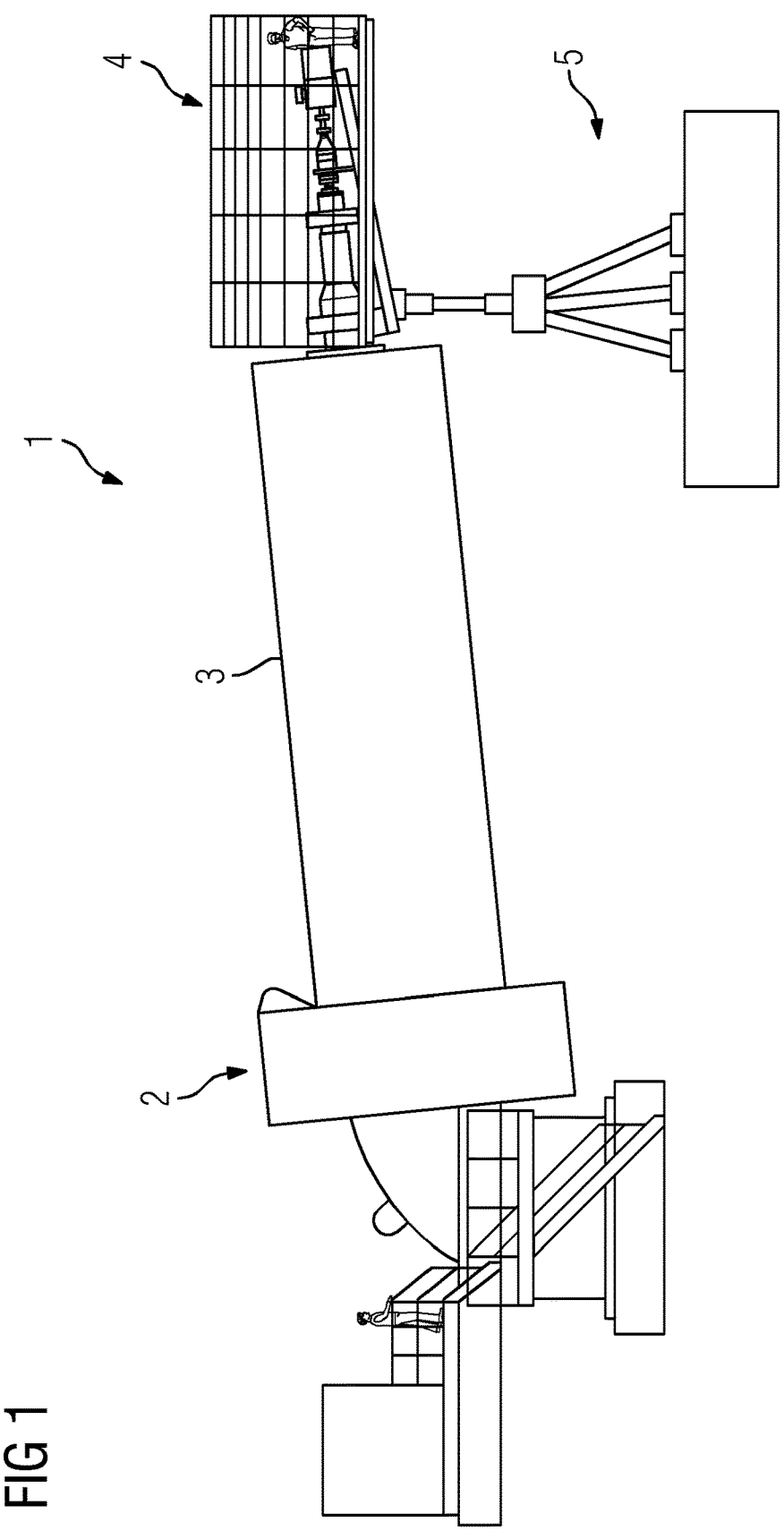

(51) Int. Cl.
*G01M 15/14* (2006.01)
*F03D 17/00* (2016.01)
*F03D 15/00* (2016.01)
*F03D 13/30* (2016.01)

(52) U.S. Cl.
CPC ............ *G01M 15/00* (2013.01); *G01M 15/14* (2013.01); *F05D 2260/83* (2013.01); *Y02E 10/72* (2013.01)

(56) References Cited

U.S. PATENT DOCUMENTS

| | | | | |
|---|---|---|---|---|
| 7,938,017 | B2 * | 5/2011 | Bisgaard | G01M 5/005 |
| | | | | 73/856 |
| 7,944,079 | B1 * | 5/2011 | Signore | F03D 15/00 |
| | | | | 290/55 |
| 7,963,160 | B2 * | 6/2011 | Bisgaard | G01M 5/0058 |
| | | | | 73/170.01 |
| 8,453,522 | B2 * | 6/2013 | Bushey | G01M 13/027 |
| | | | | 73/862.581 |
| 8,584,530 | B2 * | 11/2013 | Barnes | G01M 13/02 |
| | | | | 73/856 |
| 9,766,158 | B2 * | 9/2017 | Eusterbarkey | G01M 13/027 |
| 2009/0107255 | A1 * | 4/2009 | Jensen | G01M 5/005 |
| | | | | 73/862 |
| 2009/0173148 | A1 * | 7/2009 | Jensen | G01M 5/0058 |
| | | | | 73/116.03 |

FOREIGN PATENT DOCUMENTS

| | | |
|---|---|---|
| CN | 202041383 U | 11/2011 |
| CN | 204621527 U | 9/2015 |
| CN | 105157984 A | 12/2015 |
| DE | 102010017456 A1 | 12/2011 |
| EP | 2660583 A1 | 11/2013 |
| WO | WO 2013135246 A1 | 9/2013 |

OTHER PUBLICATIONS

Chinese Office Action for Application No. 201710522781.4, dated Jan. 8, 2019.

* cited by examiner

TEST RIG FOR A BACK-TO-BACK TEST OF A TURBINE

CROSS-REFERENCE TO RELATED APPLICATIONS

This application claims priority European application No. EP 16177071.4 having a filing date of Jun. 30, 2016, the entire contents of which are hereby incorporated by reference.

FIELD OF TECHNOLOGY

The following relates to a test rig for a back-to-back test of a turbine, comprising an axle supported in at least one bearing fixed to a carrier, a gear coupled to the axle and a motor coupled to the gear.

BACKGROUND

When designing or building a turbine or a turbine construction like a wind turbine it is necessary to test the turbine with respective surrounding components in a test surrounding being somehow similar to the surrounding where the turbine is to be installed in order to run the turbine under conditions similar to real working conditions. For test purpose a test rig is used for conducting a back-to-back test of such a turbine. The test rig allows the test of several different parts or components of such a turbine like the generator, bearings or the like.

SUMMARY

The test rig comprises, beside the turbine or respective turbine components, and axle supported in at least one, usually two bearings fixed to carrier of the rig. This axle, usually called "trumpet" is the drive axle and is coupled to the drive axle of the generator of the turbine. For testing the respective components this axle is coupled to a gear which is coupled to a motor, usually an electric motor used for driving the system. The bearing or the bearings are fixed to a carrier, at which also the gear and the motor are arranged.

Because the axle in the drive unit is mounted in at least one, usually two bearings, the gear and the axle need to be perfectly aligned in order to ensure that no radial forces resulting from a radial misalignment will occur in the system. If these radial forces become too large they can affect the system, especially the axle, as the axle will be stressed with the high radial forces and resulting moments. This can result in a poor lifetime of the trumpet and also of the gear.

SUMMARY

An aspect relates to providing an improved test rig.

For solving the above mentioned problem a new test rig is provided, with a gear bearing an arrangement comprising two radially extending arms coupled to the gear and extending in opposite directions, which arms are pivotally connected to a pair of torque arms extending in a basically horizontal direction, with the ends of the torque arms being pivotally coupled to a frame comprising lateral extensions with connections segments, to which segments respective second torque arms arranged in a basically vertical direction are pivotally connected, which second torque arms are pivotally connected to respective connection element arranged at the carrier.

The inventive test rig comprises a specifically designed gear bearing arrangement for bearing the gear. This arrangement is capable of taking radial forces and resulting torques and moments, so that they are not introduced into the system to be tested, especially the gear and the axle.

The gear bearing arrangement is a four-link torque arm system. It fixes and bears the gear and prevents the gear from rotating within the drive unit, while being capable of taking or compensating radial forces and moments resulting from any kind of misalignment.

The inventive gear bearing arrangement comprises two radially extending arms coupled to the gear extending in opposite direction. These arms are connected to the gear respectively the gear housing, they are not pivotally relative to the gear. Any movement of the gear will result in a movement of the arms.

These radially extending arms extend in opposite directions, so that any movement of the gear will result in a respective movement of the arms.

Both arms are pivotally connected to a pair of torque arms. These torque arms extend in a basically tangential direction away from the gear. The torque arms are arranged mainly in parallel to each other, which means that their longitudinal axes are basically parallel. This also includes an reverse parallel arrangement of the torque arms.

The torque arms themselves are pivotally coupled to a frame arranged adjacent to the gear. This frame comprises two lateral extensions extending in opposite directions, which each lateral extensions comprising a connection segment. To this respective connection segment two respective second torque arms are pivotally connected. These second torque arms are orientated in a basically vertical direction in respect to the first torque arms and are finally connected to a respective connection element arranged at the carrier. The second torque arms are pivotally connected to the connection element, while this connection element is tightly fixed at the carrier.

So the system mainly comprises of two pairs of first and second torque arms, which are arranged preferably mainly vertically to the each other when the rig is in a non-working condition and when the axles are in perfect alignment. The first and second torque arms are arranged mainly vertical when they are arranged in an angle of about 90° or mainly orthogonal, in respect to each other. The system furthermore comprises the respective connection members, i. e. the arms fixed to the gear and coupled to the first torque arms, and the frame coupling the first torque arms to the second torque arms. This linked torque arm system is capable to take or compensate a misalignment and any from this misalignment resulting radial forces and torques respectively moments. As this torque arm system shows an inherent flexibility due to the pivotal arrangement of the torque arms to the respective components an inherent movement of this components and arms relative to each other is possible. The gear itself is moveable within this system in a horizontal and a vertical direction and any angle in between due to the respective pivotal couplings. The pivotal axes are certainly parallel to each other.

Preferably the first and second torque arms are vertically to each other when the rig is in a non-working-condition.

For example, the first torque arms may extend horizontal and the second torque arms may extend vertical.

As explained above the two arms are tightly fixed to the gear respectively to gear housing in order to direct any misalignment and resulting force into the system. Preferably the arms coupled to the gear are part of a ring-shaped flange-like gear mounting to be fixed to the gear. As the arms extend in opposite directions and for having a tight connection of the arms to the gear a gear mounting is provided having a ring-shaped form for taking the somehow cylindrical gear respectively being fixed to the same. From this ring-shaped flange-like part of the mounting the respective arms extend in opposite directions.

For simplifying the fastening of this gear mounting the gear mounting preferably comprises two halves complementing the ring-shaped mounting, with each half comprising an arm. So each half comprises a ring segment extend around 180° at the maximum, with this ring segment being fixed to the gear. Both ring segments complement to the ring-shaped mounting.

Another central component of the torque arm system is the frame coupling the first torque arms to the second torque arms. This frame may be a flange-like frame comprising an opening through which the gear when mounted extends. So this flange-like frame surrounds the gear, which extends through the frame opening between the motor and the axle. For simplifying also the fixation of this frame it may comprise at least two frame components complementing the frame. So the frame components may be arranged while the gear is already in place.

Regarding the overall make up of this frame several embodiments are possible. According to a first alternative the lateral extensions with the connections segments are provided in the area of the upper end of the frame. So the upper frame end extending above the gear is extended in opposite directions for realizing the lateral extensions with the connection segments. The points of connection of the frame to the second vertical torque arms therefore are at the upper end of the frame resulting in respective length of theses second torque arms.

According to a second alternative the frame may have a symmetrical make up with the lateral extensions extending along the horizontal center line of the frame. Due to this embodiment the frame is symmetrical, it can especially comprise two identical frame components. In this embodiment the points of connection of the frame to the second torque arm are somehow lower compared to the first alternative resulting in shorter second torque arms.

Finally the gear bearing arrangement may comprise one or preferably more sensors for measuring a force, a load or a moment given within the bearing arrangement. These sensors, which are preferably arranged at or integrated in the second torque arms, are able to measure any relevant value necessary for analyzing the force or moment distribution or any other information relevant for the test.

The inventive gear bearing arrangement is a completely mechanical system comprising only mechanical components being arranged and coupled in the above disclosed way. It especially does not comprise any kind of hydraulic components like hydraulic cylinders or the like, which may be used in the prior art and which are arranged in a vertical direction for supporting a relevant component of the turbine arrangement to be tested, which hydraulic cylinders are hydraulically coupled. Instead the vertical misalignment is compensated by means of the first torque arm, while the horizontal misalignment is compensated by means of the second torque arms.

BRIEF DESCRIPTION

Figure 2:
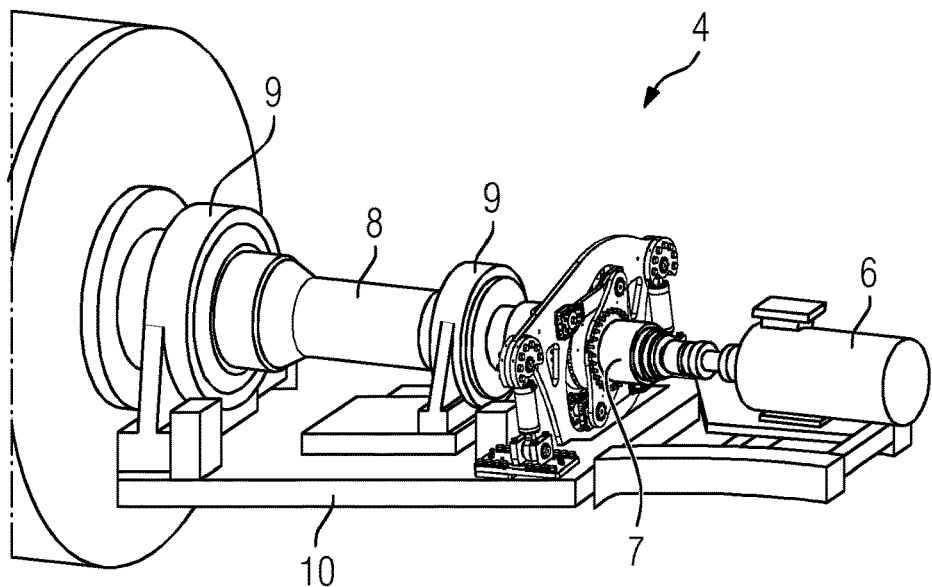
Figure 3:
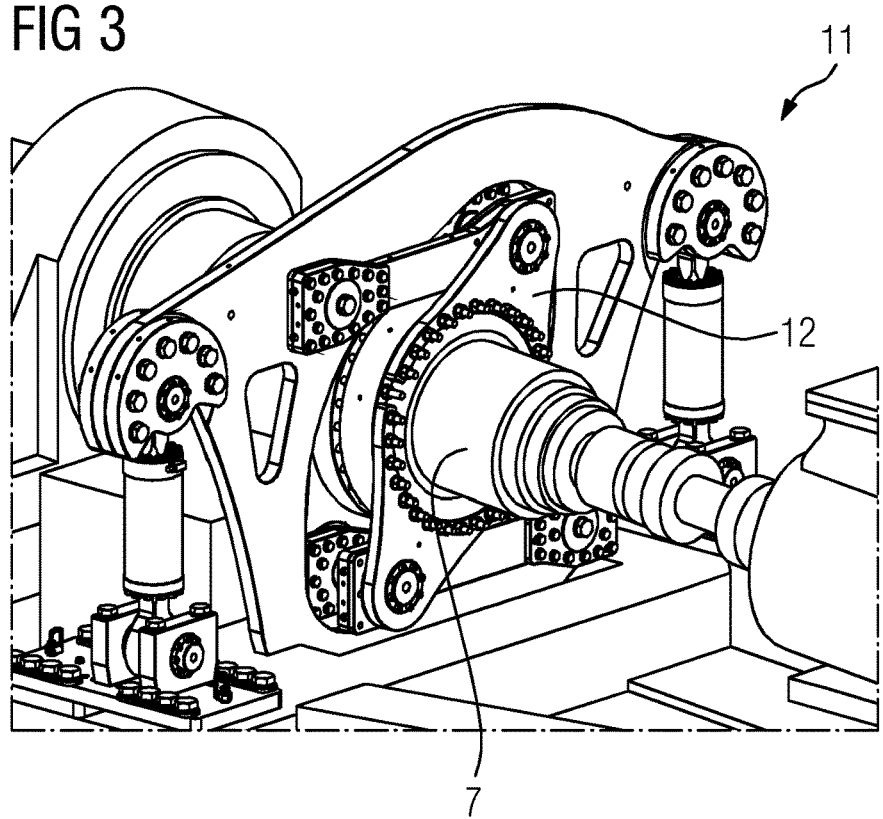
Figure 4:
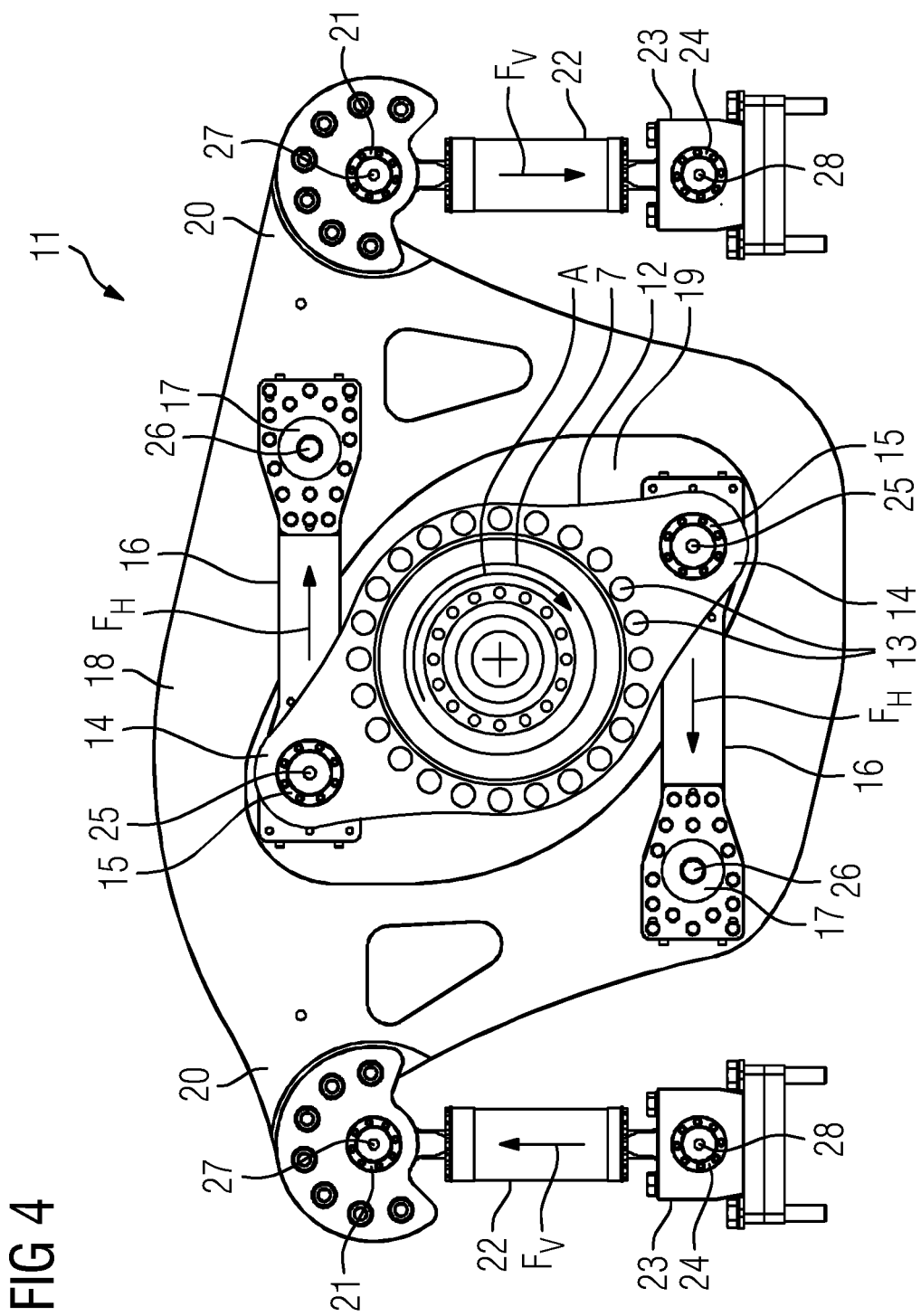
Figure 5:
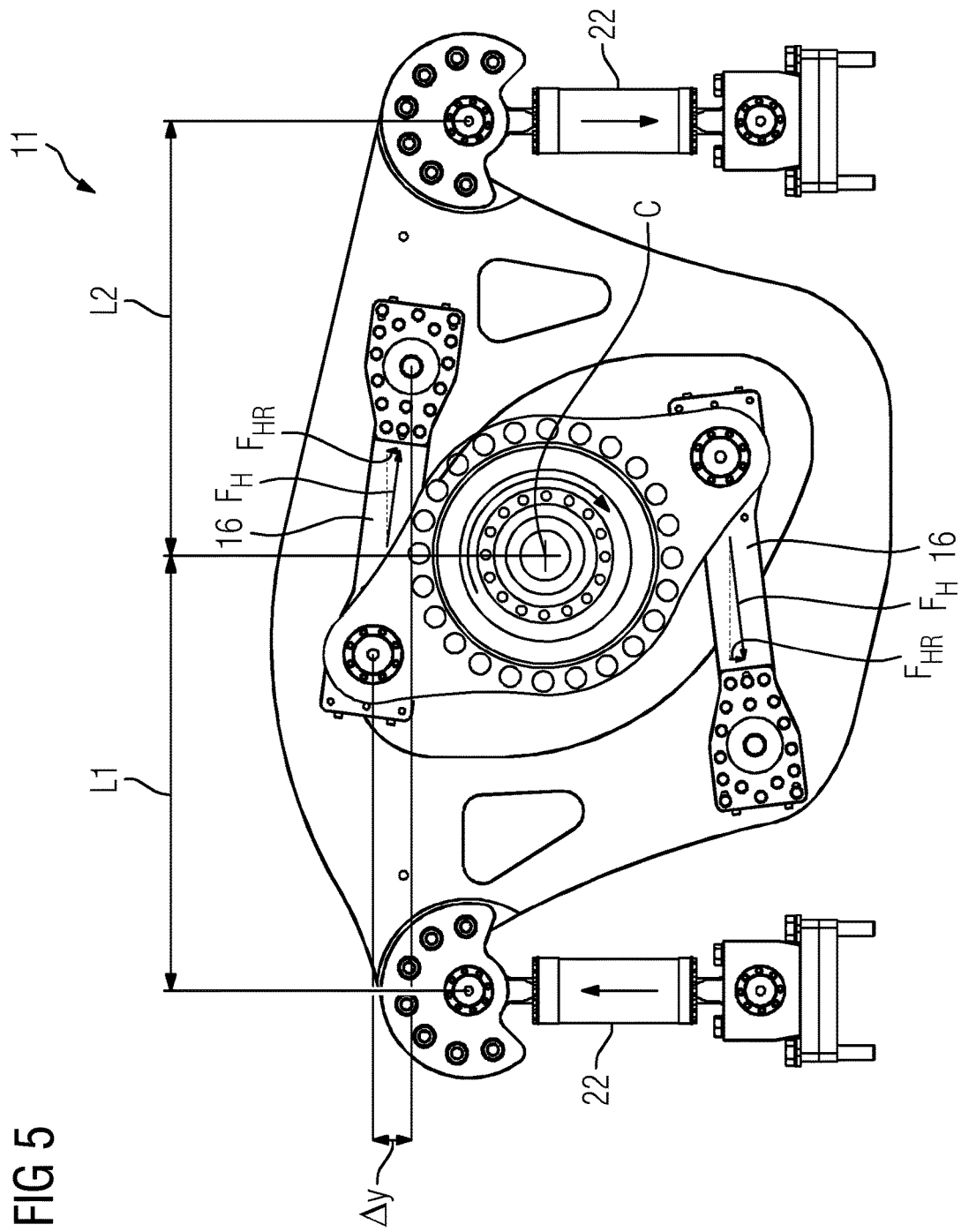
Figure 6:
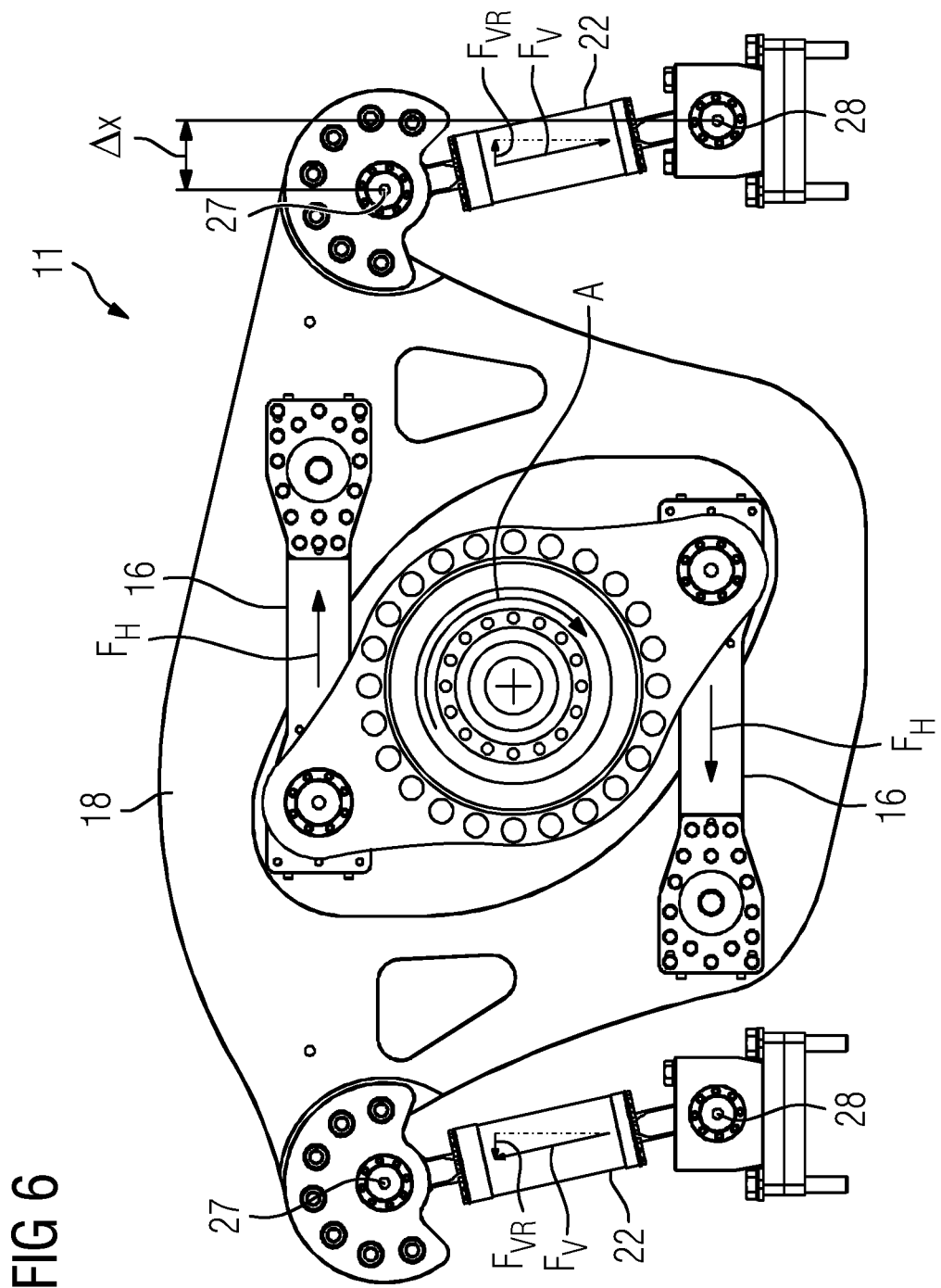
Figure 7:
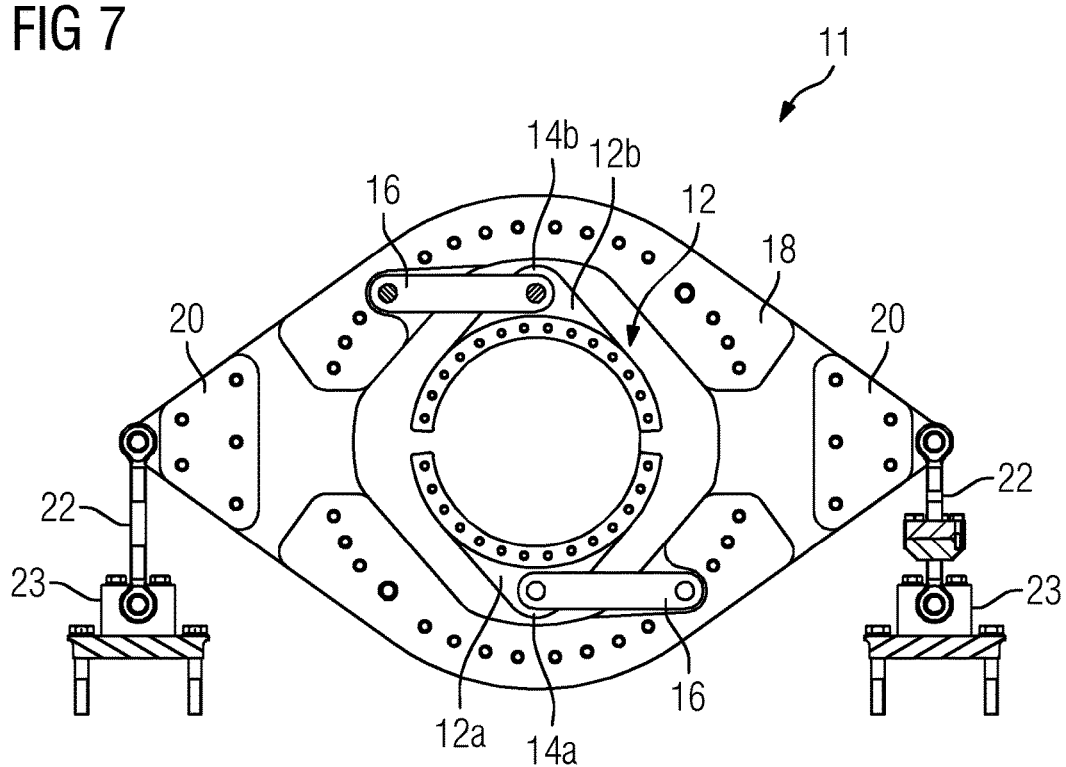

Some of the embodiments will be described in detail, with reference to the following figures, wherein like designations denote like members, wherein:

FIG. 1 shows a side view of the inventive test rig;
FIG. 2 shows an enlarged view of the drive axle, the gear arranged in the gear bearing arrangement and the motor;
FIG. 3 shows an enlarged view of the gear bearing arrangement and the gear;
FIG. 4 shows a principal sketch of the gear bearing arrangement and the gear, with the gear being in perfect alignment with the axle;
FIG. 5 shows the gear bearing arrangement of FIG. 4 with the gear being vertical misaligned;
FIG. 6 shows the gear bearing arrangement with the gear bearing horizontally misaligned; and
FIG. 7 shows a second embodiment of a gear bearing arrangement.

DETAILED DESCRIPTION

FIG. 1 shows an inventive test rig 1, for example comprising a generator 2. The test rig is for example used for performing a main bearing test for the generator bearings.

A shaft 3 is provided for coupling the generator 2 to a drive unit 4 being arranged at an elevated position by means of a load system 5.

As can be taken form FIG. 2 the drive unit 4 comprises a motor 6, preferably an electric motor, while also a hydraulic motor is suitable. This motor 6 is coupled to a gear 7, which is coupled to a drive axle 8 running to the generator 2. The drive axle 8 runs in two bearings 9 being arranged at a frame-like carrier 10. Also the motor 6 is arranged at the carrier 10, but the motor fixing means allow a certain movement of the motor 6 relative to the carrier 10 for following any misalignment of the gear 7, which is not fixed to the carrier 10, and the axle 8. The gear 7 is attached to a gear bearing arrangement 11, which is shown in detail in FIG. 3 and especially in FIG. 4.

The gear bearing arrangement 11 comprises a ring-shaped gear mounting 12 firmly attached to the gear 7 by means of respective mounting bowls 13 as can be taken from FIG. 4. The gear mounting 12 has a circular opening thorough which, see FIG. 3, the gear 7 extends. For simplifying the attachment of the gear mounting 12 it may comprise to separate, preferably identical halves or respective components with the respective ring segments for fixing those respective halves or components to the gear 7.

The gear mounting 12 further comprises two arms 14 extending in opposite directions relative to the gear 7. As the gear mounting is firmly fixed to the gear 7 the arms 14 will follow any movement of the gear 7 relative to the bearing arrangement 11.

The arms 14 comprises respective bearings 15 for pivotally connecting the arms 14 to first torque arms 16 as shown in FIG. 4. These torque arms 16 are arranged in a horizontal direction when the gear bearing arrangement 11 is unloaded.

The other end of the first torque arms 16 are pivotally connected to respective bearings 17 at a frame 18.

The frame 18 has a flange-like design and comprises and opening 19 through which the gear 7 extends, see for example FIG. 3. So the frame 18 surrounds the gear 7. The frame 18 may also comprise at least two frame components complementing the frame 18, which are, when in place, attached to each other. It may also be a one-piece frame, with the opening 19 being designed to allow the gear mounting passing to the opening 19.

As can be taken from FIG. 4 the frame 18 comprises two lateral extensions 20 arranged at the upper end of the frame 18. The lateral extensions 20 comprise respective connection segments with bearings 21, to which respective second torque arms 22 are pivotally connected. The second torque arms 22 are finally connected to respective connection elements 23 arranged at the carrier 10 in respective bearing 24, so that the second torque arms 22 are also pivotally relative to these connection elements 23 and thus the carrier 10. As can be taken from FIG. 4 the second torque arms 22 are vertically orientated when the system is unloaded.

One or more sensors (not shown) may be arranged at or integrated in the gear bearing arrangement 11 at respective positions. The sensors are used for measuring any relevant information relevant for the test or for determining the loads, moments or forces applied to the arrangement 11.

FIG. 4 shows the gear bearing arrangement 11 when the gear 7 and the axle 8 are in perfect alignment. The central axis of the gear 7 is aligned with the center axis of the axle 8. Also the respective axes 25, 26 of the first torque arm 16 and the respective axes 27, 28 of the second torque arms 22 are in a perfect horizontal respective perpendicular arrangement. When the system is in motion, as indicated by means of the arrow A, the horizontal reaction forces $F_H$ obtained in the first torque arms 16 are introduced in the torque army system. The vertical reaction forces $F_V$ are received in the second torque arms 22. As can be taken from FIG. 4 the horizontal reaction forces $F_H$ are directed opposite to each other and extinguish each other, due to the perfect alignment of the axes the same is for the vertical forces $F_V$.

FIG. 5 shows the gear bearing arrangement 11 with a misalignment in the vertical direction, as indicated by the misalignment distance Δy. The gear 7 and the axle 8 are not aligned resulting in a vertical movement of the gear 7. This movement results in a movement of the first torque arms 16 around the respective axes 25, 26. They are no longer parallel to each other but displaced in the way as shown in FIG. 5. The respective reaction forces $F_H$ are no longer parallel and opposite to each other. This results from the vertical displacement, while no horizontal displacement is given. The horizontal distances between the central axes C and the geometrically arranged second torque arms 22, denoted with L1 and L2 in FIG. 5, are the same in both directions. The resulting vertical force is shown in FIG. 5 and denoted by $F_{HR}$, the overall load transferred in vertical direction is closed to zero due to the resulting forces $F_{HR}$ cancelling each other out. Nevertheless only very small resulting forces in vertical direction are transferred to the axle 8, while the load is still transferred equally between the two torque arms 16.

FIG. 6 shows the gear bearing arrangement 11 with the gear 7 being horizontally misaligned to the axle 8. While the first torque arms 16 are still parallel to each other and horizontally oriented, the frame 18 is shifted to the left in FIG. 6, resulting in the second torque arms 22 swiveling around the respective axes 27, 28. The misalignment is denoted with Δx in FIG. 6.

In this condition only the vertical second torque arms 22 will take the displacement of the axle 8 relative to the gear 7. While the horizontal forces $F_H$ are directed opposite to each other and parallel to each other no resulting overall vertical force is applied to the system.

Due to the horizontal displacement on both sides respective resulting forces $F_{VR}$ are given. As they are directed in opposite directions see FIG. 6, and due to the stiffness of the gear bearing arrangement 11 besides the swiveling possibilities the reaction forces $F_{VR}$ will almost extinguish each other, so that the transferred load in horizontal direction will be close to zero also in this drive condition.

It is clear that in reality also displacements under different angels will occur. This leads to a movement of the first torque arm 16 and the second torque arms 22 resulting in respective reaction forces $F_{HR}$ and $F_{VR}$, but also under this condition the overall forces directed in the system in a vertical and horizontal direction will be close to zero. So in total the gear 7 and the axis 8 are not affected by high forces, torques or moments affecting their lifetime stability.

FIG. 7 finally shows another embodiment of the gear bearing arrangement 11, with the same reference numbers being used for the same elements as in the previous embodiment.

The gear bearing arrangement 11 of FIG. 7 also comprises a ring-shaped gear mounting 12 comprising of two respective halves 12a, 12b to firmly attached to the gear 7. The mounting halves 12a, 12b comprises respective arms 14a, 14b, to which the first torque arms 16 are pivotally attached.

The arrangement 11 further comprises a frame 18 of symmetrical shape. It comprises two lateral extensions 20 extending in the horizontal middle of the frame 18. Respective second torque arms 22 are pivotally fixed to the lateral extensions 20. The other end of the torque arms 22 is pivotally fixed to respective connection members 23 which are firmly fixed to the carrier not shown in FIG. 7.

The performance of the gear bearing arrangement 11, although having a somehow different make up, is the same as explained in regard to the previously mentioned embodiment.

Although the present invention has been described in detail with reference to the preferred embodiment, the present invention is not limited by the disclosed examples from which the skilled person is able to derive other variations without departing from the scope of the invention.

For the sake of clarity, it is to be understood that the use of "a" or "an" throughout this application does not exclude a plurality, and "comprising" does not exclude other steps or elements.

The invention claimed is:

1. A test rig for a back-to-back test of a turbine, comprising an axle supported in at least one bearing fixed to a carrier, a gear coupled to the axle and a motor coupled to the gear, characterized by a gear bearing arrangement comprising two radially extending arms to be coupled to the gear and extending in opposite directions, which arms are pivotally connected to a pair of torque arms extending in a basically parallel direction, with ends of the torque arms being pivotally coupled to a frame comprising lateral extensions extending in opposite directions with connection segments, to which segments respective second torque arms arranged in a basically vertical direction in respect to the pair of torque arms are pivotally connected, which second torque arms are pivotally connected to a respective connection element arranged at the carrier.

2. The test rig according to claim 1, wherein the first and second torque arms are vertically to each other when the rig is in a non-working condition.

3. The test rig according to claim 1, wherein the arms coupled to the gear are part of a ring-shaped flange-like gear mounting to be fixed to the gear.

4. The test rig according to claim 3, wherein the gear mounting comprises two halves complementing the ring-shaped mounting, with each half comprising an arm.

5. The test rig according to claim 1, wherein the frame is a flange-like frame comprising an opening through which the gear when mounted extends.

6. The test rig according to claim 5, wherein the frame comprises at least two frame components complementing the frame.

7. The test rig according to claim 5, wherein the lateral extensions with the connection segments are provided in an area of an upper end of the frame.

8. The test rig according to claim 5, wherein the frame has a symmetrical make up with the lateral extensions extending along a horizontal center line of the frame.

9. The test rig according to claim 1, wherein one or more sensors are provided in the gear bearing arrangement for measuring a force, a load or a moment given within the gear bearing arrangement.

\* \* \* \* \*